United States Patent [19]
Ichinose et al.

[11] Patent Number: 5,173,379
[45] Date of Patent: Dec. 22, 1992

[54] BATTERY INCLUDING A SEALING MEMBER AND A REINFORCING MEMBER FOR THE SEALING MEMBER

[75] Inventors: Yoshinari Ichinose; Kuniyasu Oya; Shinichi Ando; Kazuhiro Hashimoto, all of Fukushima, Japan

[73] Assignee: Sony Corporation, Tokyo, Japan

[21] Appl. No.: 819,074

[22] Filed: Jan. 10, 1992

[30] Foreign Application Priority Data

Jan. 14, 1991 [JP] Japan .............................. 3-004115[U]

[51] Int. Cl.$^5$ ............................................ H01M 2/08
[52] U.S. Cl. .................................... 429/174; 429/185; 429/56
[58] Field of Search ............... 429/171, 172, 174, 181, 429/185, 56, 180

[56] References Cited

U.S. PATENT DOCUMENTS

| | | | |
|---|---|---|---|
| 4,048,401 | 9/1977 | Epstein | 429/171 |
| 4,110,518 | 8/1978 | Gilmour et al. | 429/174 |
| 4,191,806 | 3/1980 | Levy | 429/56 |

Primary Examiner—Anthony Skapars
Attorney, Agent, or Firm—Hill, Van Santen, Steadman & Simpson

[57] ABSTRACT

A battery including a sealing member 10 for sealing an opening 7 of a battery housing 1, a current collecting pin 5 press-fitted in a through hole 11 formed through the sealing member 10, and a reinforcing member 20 for reinforcing the sealing member 10. The reinforcing member 20 is constituted of a thick-walled portion 21 for covering an outer circumferential surface of a cylindrical portion 12 of the sealing member 10 forming the through hole 11 and a disk portion 22 extending radially outwardly from the thick-walled portion 21. A space 8 is defined between the sealing member 10 and the reinforcing member 20, and a thin-walled portion 13 for preventing an increase in internal pressure in the battery housing 1 is formed in the sealing member 10 at a position opposed to the space 8. The sealing member 10 is reinforced by the thick-walled portion 21 to thereby prevent generation of cracks in the sealing member 10 and electrolyte leakage accompanied thereby. Further, when the internal pressure increases, the thin walled portion 13 is reliably broken to suppress the increase in the internal pressure.

1 Claim, 3 Drawing Sheets

BATTERY INCLUDING A SEALING MEMBER AND A REINFORCING MEMBER FOR THE SEALING MEMBER

BACKGROUND OF THE INVENTION

The present invention relates to a battery structure for preventing leakage of electrolyte or the like out of a battery.

In recent years, development in high performance and compactness of electronic equipments such as video cameras and stereo headphones has been remarkable, and demand for high capacity of a battery to be used as a power source for such electronic equipments has accordingly been increased. A manganese battery is conventionally used as such a battery, and an alkaline battery employing an alkaline electrolyte such as potassium hydroxide is widely used to obtain a larger capacity.

In general, a battery has a sealed structure, and an increase in internal pressure in the battery occurs for some reason. For example, in case of storing an alkaline battery for a long period of time, there is a possibility that zinc in a negative electrode corrodes to generate a hydrogen gas, which causes the increase in the internal pressure. When the internal pressure increases, the sealed structure is broken by the increased pressure to result in loss of a function as the battery or damage to peripheral equipments.

To prevent such a trouble, it is known that the battery is provided with a structure functioning as a relief valve adapted to relieve an excessive increase in the internal pressure. Such a structure in an alkaline battery will be described with reference to FIG. 1.

The alkaline battery shown in FIG. 1 is generally constituted of a cylindrical metal housing 51, a positive electrode 52 composed of manganese dioxide and graphite, and a gelled negative electrode 53 composed of granulated zinc, an aqueous solution of potassium hydroxide, a thickener, etc. The positive electrode 52 and the negative electrode 53 are contained in the metal housing 51 and are separated from each other by a separator 54 formed of nonwoven fabric. The metal housing 51 is integrated with the positive electrode 52 to constitute a positive electrode can. The metal housing 51 has an opening at a lower end thereof as viewed in FIG. 1. A sealing member 56 for sealing this opening is provided at the lower end of the metal housing 51, and a reinforcing member 57 for reinforcing the sealing member 56 is assembled with the sealing member 56 on the outside thereof. Further, a cover 58 serving as a negative electrode terminal is provided on the outside of the reinforcing member 57 so as to cover the opening of the metal housing 51. The cover 58 is retained at its outer periphery to the metal housing 51. The sealing member 56 is formed at its central portion with a through hole 56a, and a nail-like current collecting pin 55 is press-fitted in the through hole 56a. The reinforcing member 57 is also formed with a central through hole 57a, and a cylindrical portion 56b of the sealing member 56 is engaged with the central through hole 57a.

The sealing member 56 is formed of resin such as plastic (e.g., nylon), and it is formed with a thin-walled portion 56c functioning as a relief valve. In the case that an internal pressure in the metal housing 51 sealed by the sealing member 56 increases, the thin-walled portion 56c is broken to allow escape of an internal gas from the broken thin-walled portion 56c to the outside of the battery, thus preventing abnormal increase in the internal pressure. To allow the relief of the internal gas out of the metal housing 51, there are formed vent holes 57a and 58a through the reinforcing member 57 and the cover 58, respectively.

Although possible breakage of the battery due to an increase in the internal pressure can be effectively prevented by providing the thin-walled portion 56c in the sealing member 56 formed of plastic or the like, there is a problem in the battery having the above-mentioned structure. That is, in case of storing the battery for a long period of time, the cylindrical portion 56b of the sealing member 56 flaws or cracks at a central portion thereof (for example, in the vicinity of a shoulder 56d of the cylindrical portion 56b) to cause leakage of electrolyte or the like out of the metal housing 51. It is considered that the occurrence of the flaws or cracks is primarily caused by an internal stress to be generated in the sealing member 56 because of expansion of a diameter of the through hole 56a of the sealing member 56 upon press-fitting of the current collecting pin 55 into the through hole 56a.

OBJECT OF THE INVENTION

It is accordingly an object of the present invention to provide a battery which can reliably prevent the breakage of the battery due to an increase in the internal pressure and suppress generation of flaws or cracks in the sealing member even in case of storing the battery for a long period of time.

DESCRIPTION OF THE PREFERRED EMBODIMENTS

According to the present invention achieving the above object, there is provided in a battery including a battery housing containing a positive electrode member and a negative electrode member, a sealing member for sealing an opening formed at one end of said battery housing, said sealing member being provided with a cylindrical portion having a through hole, a reinforcing member for reinforcing said sealing member, and a current collecting pin press-fitted in said through hole of said sealing member; the improvement characterized in that said reinforcing member is provided with a plate portion retained at an outer periphery thereof to said battery housing and a thick-walled portion having a hole engaging with an outer circumferential surface of said cylindrical portion of said sealing member, said thick-walled portion having a wall thickness larger than that of said plate portion; and said sealing member is formed with a thin-walled portion at a position opposed to a space defined between said sealing member and said reinforcing member.

With this arrangement, the thick-walled portion of the reinforcing member is formed around the hole engaging with the outer circumferential surface of the cylindrical portion of the sealing member, so that the cylindrical portion is widely covered with the thick-walled portion and securely retained thereby. Further, the reinforcing member is retained at its outer periphery to the battery housing. Accordingly, even if there exists an internal stress in the cylindrical portion and in the vicinity thereof due to the press-fitting of the current collecting pin in the through hole of the cylindrical portion, the generation of flaws or cracks in the cylindrical portion and in the vicinity thereof can be suppressed.

Further, in the case that the internal pressure in the battery housing sealed by the sealing member increases, the thin-walled portion of the sealing member is expanded and broken into the space opposed to the thin-walled portion, thereby reliably preventing abnormal increase in the internal pressure in the battery housing.

There will now be described a preferred embodiment of the present invention with reference to the drawings.

Figure 2:
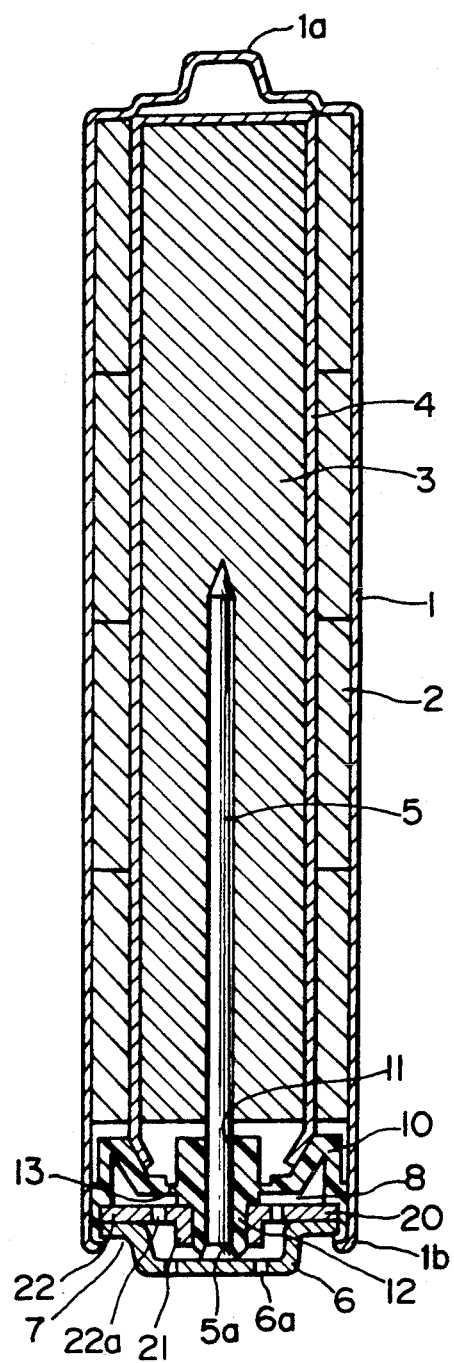
FIG. 2 is a vertical sectional view of the alkaline battery according to a preferred embodiment of the present invention.

The battery according to the preferred embodiment is an alkaline battery, and as shown in FIG. 2, the alkaline battery is generally constituted of a cylindrical metal housing 1 closed at an upper end thereof and having an opening 7 at a lower end thereof, a positive electrode 2 composed of manganese dioxide and graphite, and a gelled negative electrode 3 composed of granulated zinc, an aqueous solution of potassium hydroxide, a thickener, etc. The positive electrode 2 and the negative electrode 3 are contained in the metal housing 1 and they are separated from each other by a separator 4 formed of nonwoven fabric. The metal housing 1 is integrated with the positive electrode 2 to constitute a positive electrode can. A cylindrical outer surface of the metal housing 1 is covered with an insulating film (not shown) for an exterior label. The upper end of the metal housing 1 is projected to constitute a positive electrode terminal 1a.

As shown in FIG. 2 the positive electrode 2 of the battery according to the preferred embodiment consists of a plurality of separate ring elements. This is due to the fact that when the positive electrode 2 is separated, it can be compacted with a higher density to desirably enable charging of a larger amount of active material for the positive electrode.

Figure 3:
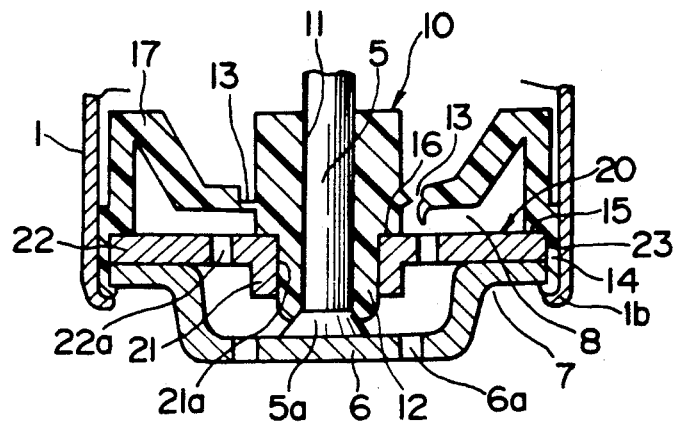
FIG. 3 is a vertical sectional view of an essential part of the alkaline battery shown in FIG. 1.

As shown in FIGS. 2 and 3, a sealing member 10 is inserted in the opening 7 of the metal housing 1 to seal the opening 7. There is provided outside the sealing member 7 a reinforcing member 20 having a central hole 21a with which a cylindrical portion 12 of the sealing member 10 is engaged. Further, a disk-shaped metal cover 6 is so mounted as to cover the reinforcing member 20 from the outside thereof.

As shown in more detail in FIG. 3, the sealing member 10 is provided with the cylindrical portion 12 having a central through hole 11 and a shoulder 16, a sealing portion 17 for separating the inside of the metal housing 1 from the outside thereof, and an outer circumferential portion 14 contacting an inner circumferential surface of the metal housing 1. These portions are integrally formed like a top-shape having an axis of the cylindrical portion 12. A thin-walled portion 13 is annularly formed so as to connect the cylindrical portion 12 and the sealing portion 17. The thin-walled portion 13 may be formed continuously or intermittently. The sealing member 10 is formed of preferably resin such as plastic, more preferably nylon such as nylon 66. As will be hereinafter described, there is defined a space 8 between the thin-walled portion 13 and the reinforcing member 20 assembled with the cylindrical portion 12 of the sealing member 10.

The reinforcing member 20 is formed in a disk-shape consisting of a disk portion 22 extending radially outwardly and having a substantially constant thickness and a thick-walled portion 21 formed substantially centrally of the disk portion 22 and projecting downwardly as viewed in FIG. 3 to have a thickness larger than that of the disk portion 22. The central hole 21a of the reinforcing member 20 is formed centrally of the thick-walled portion 21. The reinforcing member 20 is preferably formed of a material (e.g., metal material such as iron) having a strength considerably higher than that of the sealing member 10.

The central hole 21a of the reinforcing member 20 is engaged with the cylindrical portion 12 of the sealing member 10 so that the central portion of the reinforcing member 20 abuts against the shoulder 16 of the cylindrical portion 12. Accordingly, the thick-walled portion 21 of the reinforcing member 20 around the central hole 21a widely covers the cylindrical portion 12 of the sealing member 10. An upper, outer circumferential part of the disk portion 22 of the reinforcing member 20 abuts against a shoulder 15 of the sealing portion 17 of the sealing member 10, and an outer circumferential end 23 of the disk portion 22 abuts against an inner surface of the outer circumferential portion 14 of the sealing member 10. In this manner, the thick-walled portion 21 of the reinforcing member 20 widely covers the cylindrical portion 12 of the sealing member 10 to securely retain the same, and the disk portion 22 of the reinforcing member 20 is retained at its outer circumference through the outer circumferential portion 14 of the sealing member 10 to the metal housing 1. The retention of the reinforcing member 20 is stabilized by the shoulders 15 and 16 of the sealing member 10.

A nail-like current collecting pin 5 formed of brass, for example, is inserted through the central through hole 11 of the sealing member 10 into the negative electrode 3. If a gap exists between the current collecting pin 5 and the through hole 11, the sealing of the opening 7 by the sealing member 10 is impossible. Therefore, a sufficient interference is considered in the through hole 11. The cover 6 contacts a lower end 5a of the current collecting pin 5 and covers the reinforcing member 20. The cover 6 projects downwardly to constitute a negative electrode terminal. The cover 6 is welded to the lower end 5a of the current collecting pin 5 to ensure electrical connection therebetween. The cover 6 is retained at its outer circumference through a lower end of the outer circumferential portion 14 of the sealing member 10 to a lower end 1b of the metal housing 1. In this manner, the cover 6 is assembled with the metal housing 1 and both are electrically insulated from each other.

When the current collecting pin 5 is press-fitted with the through hole 11 formed through the cylindrical portion 12 of the sealing member 10, an internal stress due to the press-fitting is generated in the cylindrical portion 12. Particularly in case of storing the battery for a long period of time, the existence of such an internal stress readily causes generation of flaws or cracks in the cylindrical portion 12. However, according to the preferred embodiment, as the cylindrical portion 12 is covered with the thick-walled portion 21 and is securely retained thereby, the generation of flaws or cracks due to the internal stress in the cylindrical portion 12 can be suppressed. Accordingly, even when the battery according to the preferred embodiment is stored for a long period of time, there is no possibility of the generation of flaws or cracks in the sealing member 10.

Further, as mentioned above, the thin-walled portion 13 functioning as a relief valve is formed in a part of the sealing portion 17 of the sealing member 10. Accordingly, in the event that an internal pressure in the metal housing 1 sealed by the sealing member 10 increases, the thin-walled portion 13 is broken as shown in FIG. 3 to relieve an internal gas in the metal housing 1 from the broken thin-walled portion 13 to the outside of the metal housing 1, thus preventing abnormal increase in the internal pressure. To allow the relief of the internal gas to the outside of the metal housing 1, there are formed vent holes 22a and 6a through the reinforcing member 22 and the cover 6, respectively. More specifically, when the internal pressure in the metal housing 1 increases, the thin-walled portion 13 is expanded outwardly (downwardly as viewed in FIG. 3) to be finally broken. It is therefore necessary to define a space for allowing expansion of the thin-walled portion 13 on the outside thereof. In this respect, according to the preferred embodiment, the space 8 is defined between the sealing member 10 and the reinforcing member 20, and the thin-walled portion 13 is opposed to the space 8. With this arrangement, when the internal pressure in the metal housing 1 increases, the thin-walled portion 13 is expanded into the space 8 to be broken, thereby reliably preventing abnormal increase in the internal pressure.

Figure 4:
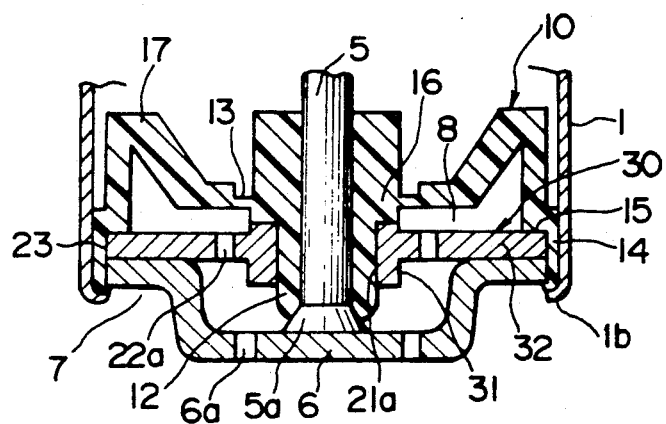
FIG. 4 is a vertical sectional view of an essential part of a modification of the alkaline battery according to the present invention.
Figure 5:
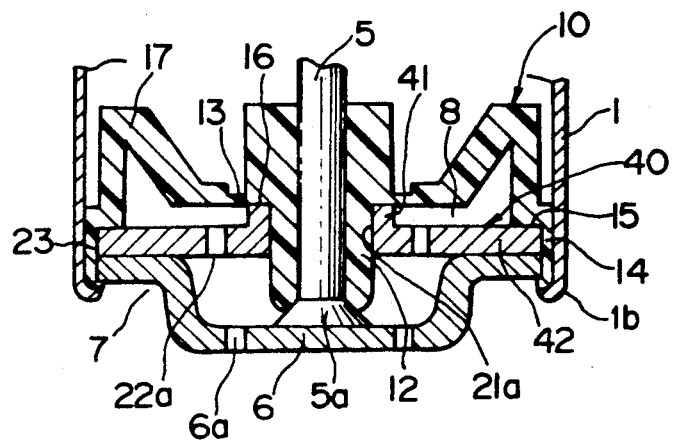
FIG. 5 is a vertical sectional view of an essential part of another modification of the alkaline battery according to the present invention.

Having thus described a preferred embodiment of the present invention, it is appreciated that the present invention is not to be limited to the above preferred embodiment. For example, the reinforcing member may be modified in shape as shown in FIGS. 4 and 5. Referring to FIGS. 4 and 5, substantially the same parts as those in FIG. 3 are designated by the same reference numerals, and the explanation thereof will be hereinafter omitted. While the thick-walled portion 21 of the reinforcing member 20 shown in FIGS. 2 and 3 projects downwardly from the disk portion 22, a thick-walled portion 31 of a reinforcing member 30 shown in FIG. 4 projects upwardly and downwardly from a disk portion 32. The cylindrical portion 12 of the sealing member 10 is securely retained by the thick-walled portion 31. In the modification shown in FIG. 5, a thick-walled portion 41 of a reinforcing member 40 projects upwardly from a disk portion 42, and the same effects as the above can be obtained.

Figure 1:
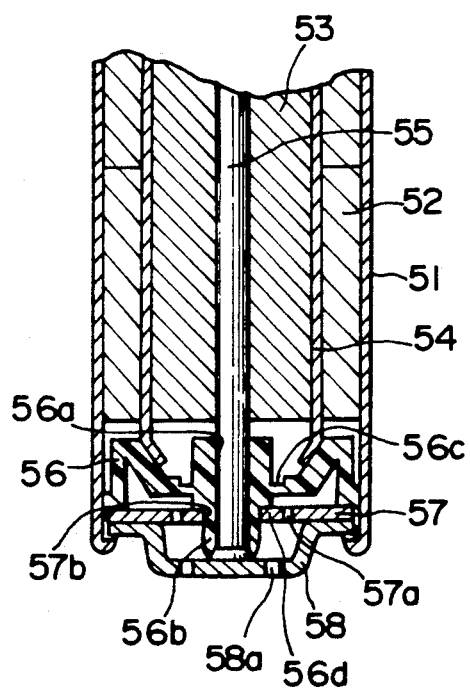
FIG. 1 is a vertical sectional view of an essential part of a conventional alkaline battery.

To confirm the effect of the reinforcing members 20, 30 and 40 shown in FIGS. 3, 4 and 5, respectively, three kinds of alkaline batteries substantially the same as the battery shown in FIG. 2 were prepared by using the reinforcing members 20, 30 and 40 with the thickness of the disk portions 22, 32 and 42 set to 0.8 mm and the thickness of the thick-walled portions 21, 31 and 41 set to 1.4 mm. A hundred of each kind of the battery were prepared. Further, a hundred of batteries using a conventional reinforcing member (the reinforcing member 57 shown in FIG. 1) having a thickness of 0.8 mm were also prepared. These batteries according to the present invention and the prior art were stored at 71° C. for 100 days. As the result, the rate of occurrence of electrolyte leakage from the batteries using the reinforcing members 20, 30 and 40 according to the present invention was 0%. To the contrary, the rate of occurrence of electrolyte leakage from the batteries using the conventional reinforcing member 57 was 18%.

Further, to confirm the effect of the thin-walled portion 13 of the sealing member 10, ten batteries shown in FIG. 2 and ten batteries with the space 8 removed were prepared, and these batteries were charged with a current of 2 A (amperes) by way of trial. As the result, the thin-walled portion 13 of all the batteries (having the space 8) shown in FIG. 2 was broken to function as a relief valve. To the contrary, the thin-walled portion 13 of the batteries without the space 8 was not broken, but the batteries themselves were broken.

As described above, according to the present invention, the thin-walled portion for preventing abnormal increase in the internal pressure is formed at a position opposed to the space defined between the sealing member and the reinforcing member. Accordingly, when the internal pressure in the battery housing sealed by the sealing member increases, the thin-walled portion is expanded by the internal pressure into the space opposed thereto and is broken to thereby prevent abnormal increase in the internal pressure, thus preventing breakage of the battery. Furthermore, the cylindrical portion of the sealing member forming the through hole is securely retained and reinforced by the thick-walled portion of the reinforcing member. Accordingly, even when there exists an internal stress to be generated by press-fitting the current collecting pin into the through hole, the occurrence of flaws or cracks in the cylindrical portion and in the vicinity thereof due to the internal stress in case of long-term storage of the battery can be reliably suppressed. Thus, it is possible to obtain a battery improved in tightness of electrolyte leakage and safety.

We claim as our invention:

1. In a battery including a battery housing containing a positive electrode member and a negative electrode member, a sealing member for sealing an opening formed at one end of said battery housing, said sealing member being provided with a cylindrical portion having a through hole, a reinforcing member for reinforcing said sealing member, and a current collecting pin press-fitted in said through hole of said sealing member; the improvement characterized in that:

said reinforcing member is provided with a plate portion retained at an outer periphery thereof to said battery housing and a thick-walled portion having a hole engaging with an outer circumferential surface of said cylindrical portion of said sealing member, said thick-walled portion having a wall thickness larger than that of said plate portion; and said sealing member is formed with a thin-walled portion at a position opposed to a space defined between said sealing member and said reinforcing member.

* * * * *